UNITED STATES PATENT OFFICE.

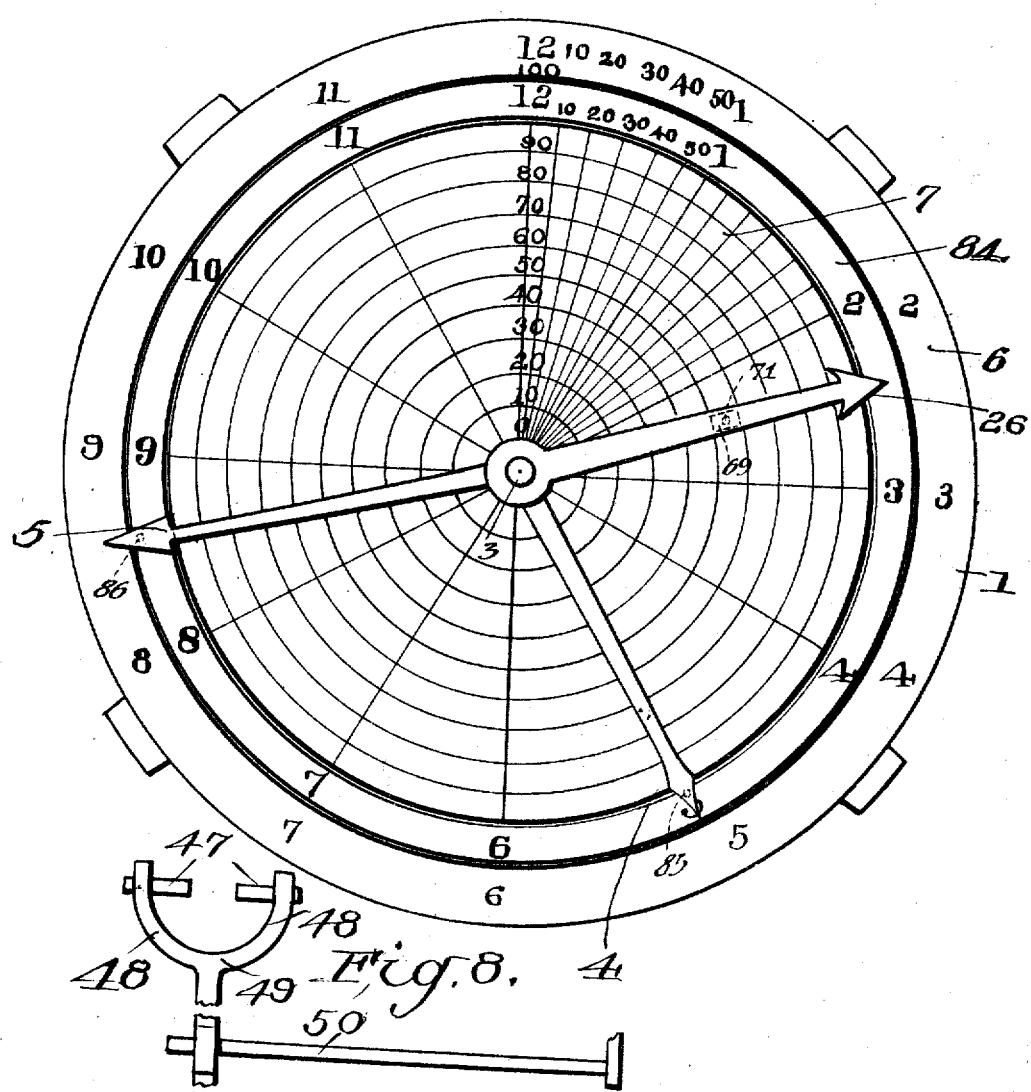

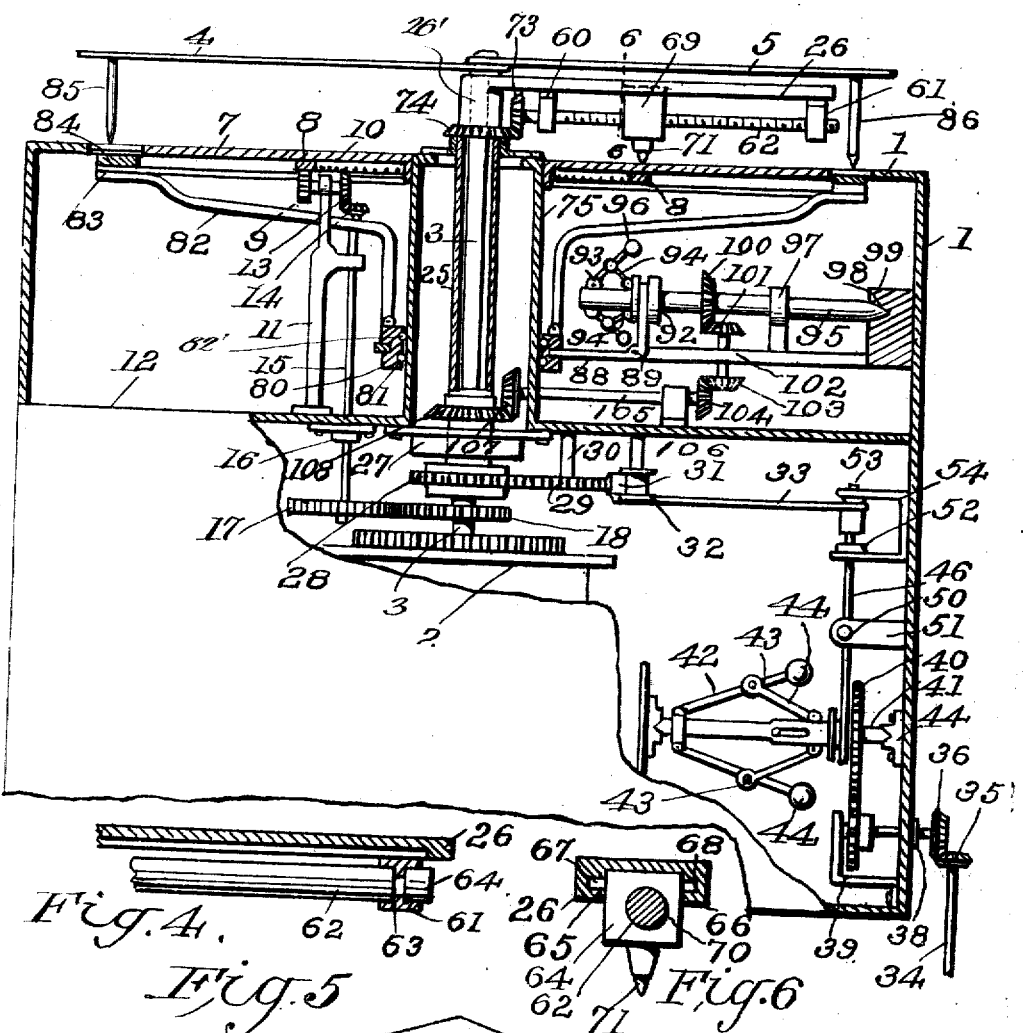

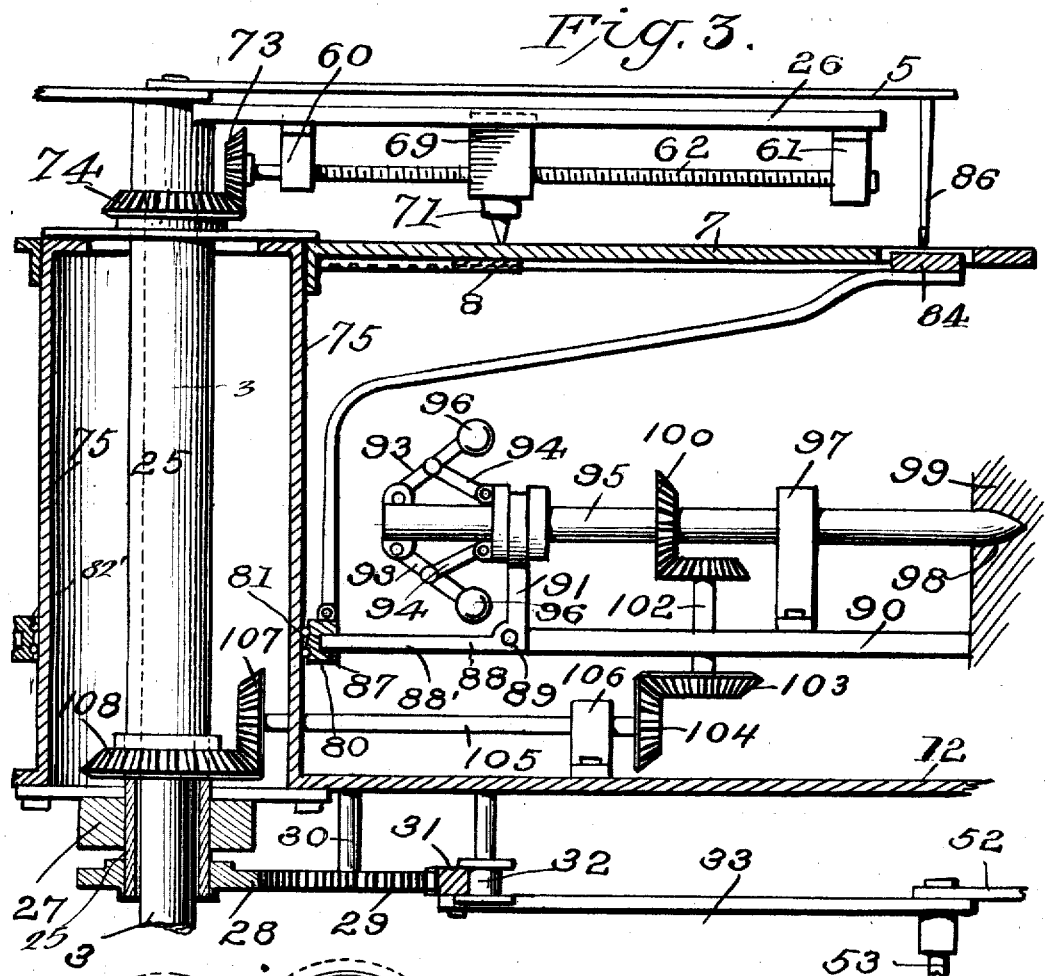
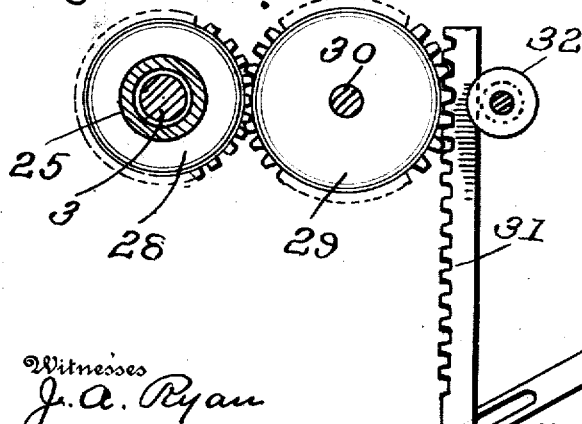

CHARLES T. COOK, OF PITTSBURG, TEXAS.

COMBINED CLOCK-SPEED REGULATOR AND RECORDER.

1,264,277.

Specification of Letters Patent.

Patented Apr. 30, 1918.

Application filed June 18, 1915. Serial No. 34,864.

*To all whom it may concern:*

Be it known that I, CHARLES T. COOK, a citizen of the United States, residing at Pittsburg, R. F. D. #7, in the county of Upshur and State of Texas, have invented certain new and useful Improvements in Combined Clock-Speed Regulators and Recorders; and I do hereby declare the following to be a full, clear, and exact description of the invention, such as will enable others skilled in the art to which it appertains to make and use the same.

This invention relates to improvements in speed recording and indicating devices of that nature adapted to make a permanent record of the speed of the vehicle to which it is attached.

The primary object of this invention is the provision of a speed recorder, register and indicator, which embodies mechanism for recording the speed of travel of the vehicle to which the device is attached for each minute of every hour of the travel, making a permanent record of the rate of speed and also to embody a hand or needle which traverses over a dial whereby the person driving the vehicle may readily ascertain the rate of speed at the time that he looks at the recorder.

Another object of this invention is the provision of a mechanism for recording the stop, the length of time consumed while the vehicle is at a standstill and also recording the time of starting of the same whereby the exact number of hours and minutes traveled may be determined.

It is also an object of this invention to provide a recording device adapted to make a permanent record of the various speeds of the vehicle at any time during a certain interval, so as to afford a ready record by means of which the maximum or minimum rate of speed may be quickly and accurately ascertained. This is oftentimes desirable, for the reason, that certain jurisdictions have speed ordinances and the question of whether or not the vehicle was exceeding the speed limit at a certain time often becomes the subject of dispute.

A still further object of the invention is the provision of a device as specified which is adapted to be connected with a running gear of a vehicle or railway train for operation thereby for determining the speed of the vehicle or train.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved clock, speed register, and recorder, Fig. 2 is a central sectional view through the improved device, showing the outer casing thereof broken away, Fig. 3 is an enlarged fragmentary view of a part of the internal mechanism for operating the device, Fig. 4 is a detail fragmentary view of the recording mechanism, Fig. 5 is a detail perspective view of the recording pencil or stylus, Fig. 6 is a cross sectional view taken on the line 6—6 of Fig. 2, Fig. 7 is a detail view in plan of a part of the speed registering mechanism, and Fig. 8 is a detail view in plan of a part of the speed registering and recording mechanism.

Referring more particularly to the drawings, 1 designates the outer protector casing of the speed register, recorder and clock, which has disposed therein a clock mechanism 2. The clock operating mechanism 2 has the hand operating arbor or shaft 3 thereof positioned vertically within the casing and the hour or minute hands 4 and 5, consecutively are mounted upon the outer end of the clock hand carrying arbor or shaft 3, and they are spaced upwardly from the dial 6 which has the ordinary time designating characters formed thereupon.

A speed recording dial is positioned inwardly of the dial 6, which latter dial is substantially a hollow ring secured to the casing 1 in any suitable manner. The speed recording dial 7 is rotatably mounted within the casing and it has a plurality of depending and circularly disposed rack teeth 8 formed upon the undersurface thereof.

The rack teeth 8 which are formed upon the undersurface of the dial 7 has meshing therewith a pinion 9, which pinion is carried by a stub shaft 10 supported by a supporting bracket 11 which extends within the interior of the casing and is mounted upon a partition 12 which extends transversely through the casing. A stub shaft 10 has a beveled gear 13 mounted upon the end opposite to the gear 9, which beveled gear meshes with a second beveled gear 14. The beveled gear 14 is mounted upon the upper end of a vertically extending shaft 15. The vertical shaft 15 which extends through the partition 12 is rotatably seated in a bearing 16 and has a gear 17 mounted upon its lower end. The gear 17 meshes with a gear 18 which is carried by the clock hand carrying arbor or shaft 3, so that the dial 7 will be rotated synchronously with the rotation of the hand, the purpose of which will be hereinafter more fully described.

The dial 7 is divided into a plurality of circles and radiating segments, as shown in Fig. 1 of the drawing, which have various designating characters such as numerals 10, 20, 30, 40, 50, etc., for designating the number of miles traveled as well as the rate of speed of the travel of the vehicle. The various circular sections 20 in which the dial 7 is divided are provided for the designation of the rate of speed per hour of the vehicle during the trip by the vehicle upon which the invention is mounted.

The shaft 3 has a sleeve 25 positioned exteriorly about the same, which sleeve projects through the dial 7 and has a speed registering hand 26 mounted above its upper terminal end, which registering hand is stationarily supported by a sleeve 26'. The sleeve 25 which projects below the partition 12, is rotatably seated in a flange 27, which is secured to the undersurface of the partition 12, and it has a gear 28 mounted upon its lower end. The gear 28 meshes with a pinion 29, which is carried by the stub shaft 30. The stub shaft 30 is suspended from the partition 12, as is clearly shown in the drawings.

A rack bar 31, which travels over a guide roller 32 meshes with the pinion 29 and rotates the same for rotating the shaft 25 through the medium of the gear 28.

The rack bar 31 is carried by a lever 33, which lever is controlled by the speed of travel of the vehicle through the medium of the mechanism hereinafter described.

A flexible shaft 34 is connected or has communication in any suitable way (not shown) with one of the wheels of the vehicle or car upon which the device is mounted, and it is rotated by the rotation of this wheel. The shaft 34 has a beveled gear 35 provided upon the upper end which meshes with a beveled gear 36. The beveled gear 36 is mounted upon a shaft 37, which is journaled in bearings 38 formed in the casing 1. The shaft 37 extends inwardly within the casing 1 and has a gear 39 mounted upon its inner end. The gear 39 meshes with a gear 40. The gear 40 is mounted upon the shaft 41 of a centrifugal governor 42. The shaft 41 has a sleeve 43 slidably mounted thereupon, which sleeve is connected to the arm 44 on the governor 42, and it will be moved longitudinally upon the shaft 41 upon movement of the governor arm. The sleeve 43 is provided with a pair of flanges 45 mounted upon its lower end, between which flanges the bifurcated or yoked end of the lever 46 is connected by inwardly extending pins 47, which are secured to the ends of the arms 48 of the yoke 49 which is formed on the lever 46. The lever 46 is rigidly mounted upon a rock shaft 50, which is journaled in a bracket 51. The bracket 51 is carried by the casing and projects transversely thereinto. The lever 46 is engaged by an arm 52, which arm is carried by a rock shaft 53 journaled in a U-shaped bracket 54 and it has the lever 33 mounted thereupon, so that the lever will be moved in an oscillatory manner, moving the rack bar 31 forwardly or rearwardly upon the rocking of the rock shaft 53.

The operation of the rack 31 and lever 33 operating mechanism is as follows:

The governor 42 is driven by the vehicle wheel when the vehicle is in motion, through the medium of the gears hereinbefore described, and the rapid rotation of the governor arms 44 act to raise the sleeve 43 to which the yoked end 49 on the lever 46 is attached. The yoked end 49 of the lever is thereby raised, causing the opposite end to move downwardly and rotate the rock shaft 53 through the medium of the arm 52, which oscillates the lever 33. The greater the speed of the vehicle, the greater the arch through which the lever 33 oscillates will be, and consequently the rack 31 will be moved to a greater distance which will increase the rotation of the sleeve and the feed screw 62 hereinafter more fully described.

The indicating hand 26 has bearings 60 and 61 extending therefrom in which is rotatably seated a screw threaded rod 62. The bearing 61 has an inwardly extending flange 63 formed thereon. An annular groove 64 formed in the end of the screw threaded rod 62 serves to prevent longitudinal movement of the yoke rod with respect to the indicating hand 26. The under surface of the indicating hand 26 is grooved and provided with longitudinally extending transversely projecting grooves or slots 65 and 66, which receive the lugs or tendons 67 and 68, respectively, which are formed upon the pencil or scriber carrying block 69. The pencil carrying block 69 is provided with an internally screw threaded bore 70 which extends therethrough and which receives the rod 62. Upon rotation of the rod 62 the block 69 will be moved longitudinally upon the rod 62. The block 69 has a stylus or pencil 71 secured to the underside thereof, which pencil depends from the hand 26 and engages the surface of the dial 7 for permanently recording the various rates of speed of travel of the vehicle to which the invention is attached for each and every hour or minute of the day.

The rod 62 has a beveled gear 73 mounted upon its inner end, which beveled gear meshes with the beveled gear 74. The beveled gear 74 is rotated by the sleeve 25, and the beveled gear 73 meshing therewith, will rotate the rod 62 in one direction or another, depending upon the direction of movement of the arm 26, which will move the stylus or pencil 71 either inwardly or outwardly upon the rod 62 causing the same to designate upon the dial 7, the various rates of speed of travel of the vehicle.

The upstanding substantially circular central projections 75 carries a sleeve 80 slidably mounted thereupon, which sleeve is provided with ball races 81 in which ball bearings 82' are seated for diminishing the friction generated during the longitudinal movement upon the projections 75 of the sleeve or collar 80. The collar 80 has a plurality of radiating arms 82 which are secured thereto and extending upwardly therefrom, which arms are secured to the undersurface of a ring 83. The ring 83 has a dial 84 secured to its outer surface, which dial is provided with the characters and divisions such as are employed for marking off the dial of a clock, for designating time. The dial 84 is provided for insertion within the circular space which is left between the dials 6 and 7 and it is positioned directly beneath the end of the clock hands 4 and 5. The clock hands 4 and 5 have pencils or styli 85 and 86, respectively secured thereto and depending therefrom for marking engagement with the dial 84, when the dial is moved upwardly, as will be hereinafter more fully described.

The sleeve 80 is provided with annular recess 87 in which is seated the yoked end of a bell crank arm 88. The bell crank arm 88 is pivoted at 89 to a bracing bracket 90, which extends transversely within the casing 1. The upper end of the arm 91 of the bell crank arm 88 is also forked and the arms of the fork span a sleeve 92. The sleeve 92 forms a part of the construction of a centrifugal governor 93. The arms 94 of the governor 93 are connected to the sleeve 92, so that the sleeve will be moved longitudinally upon the governor shaft 95 upon the spreading of the arms of the governor due to the centrifugal force of the weight 96 upon the rotation of the shaft 95. The shaft 95 is rotatably seated in a bearing 97 which is supported by the transversely extending plate 90, and it has its forward end pointed and seated in a substantially conical shaped bearing opening 98 which is formed in the bearing block 99, as clearly shown in Figs. 2 and 3 of the drawings.

The shaft 95 is rotated through meshing engagement with miter gears 100 and 101. The miter gear 101 is mounted upon the upper end of the stub shaft 102, which stub shaft is journaled in the plate 9 and extends below the plate, having a beveled gear 103 mounted thereupon. The beveled gear 103 meshes with the beveled gear 104 which is mounted upon the outer end of a horizontal shaft 105. The shaft 105 is rotatably mounted in a bearing 106, and in the upstanding projection 75 which is formed on the partition 12. The shaft 105 has a beveled gear 107 mounted on the end which extends into the upstanding projection 75 and the bevel gear 107 meshes with a gear 108 which is rigidly mounted upon the sleeve 25 for rotation therewith.

When the sleeve 25 is being rotated by the travel of the vehicle, as has been heretofore described, the governor shaft 95 will be rotated synchronously therewith through the meshing engagement of the various bevel and miter gears, as has been heretofore mentioned. The rotation of the governor shaft 95 will cause the governor arms 94 to spread moving the sleeve or collar 92 longitudinally upon the shaft 95 and forcing the arm 88' of the bell crank arm 88 downwardly, moving the sleeve 80 downwardly upon the projection 75, which will move the ring 83 of the dial 84 downwardly and prevent engagement between the pencils 85 and 86 which are carried by the clock hands 4 and 5 on the dial 84. Immediately upon the cessation of the rotation of the sleeve 25, the governor 93 will stop rotating and the arm 94 thereof will drop down, causing the sleeve 92 to move toward the outer end of the shaft 95 and consequently moving the arm 88' of the bell crank arm 88 outwardly forcing the ring 83 upwardly so that the dial 84 will be engaged by the pencils 85 and 86 carried by the clock hands, which pencils will designate upon the dial 85, the exact length of time which the vehicle is stopped, thereby recording or making a positive permanent record of the length of time that the vehicle or train is stopped in each and certain intervals during the day or the trip being made.

In the operation of this clock, speed register and recorder:

The rate of speed of travel of the vehicle will be imparted to the speed indicating stylus 71 through the operation of the lever 33 and the mechanism heretofore described for the operation of the same, which will move the rack bar 31 longitudinally between the rollers and the gear 29, causing the teeth of the rack bar to mesh with the gear 29, which will impart rotation to the sleeve 25 through the meshing engagement with the gear 28, which gear is rigidly mounted upon the lower end of the sleeve. The rotation of the sleeve 25 will move the stylus 71 so that the same will register at the various numerals or characters which are marked upon the dial 7 the rate of speed of travel of the vehicle at the time, by means of which the driver of the car or vehicle may quickly ascertain the exact rate of speed at which the vehicle or car is traveling when he looks at the dial.

The movement of the hand 26 through the meshing engagement of the gear 73 with the beveled gear 74 will rotate the shaft 62 which is carried by the hand 26, and the rotation of the screw threaded rod 62 will move the stylus 71 forwardly or rearwardly upon the rod depending upon the direction of rotation of the rod, which will rotate upon the dial 7 at the rate of speed of travel of the vehicle, and owing to the fact that this dial is used in conjunction with a clock dial formed upon the ring 84, the exact number of miles traveled by the vehicle to which the device is attached may be ascertained by computing the record of the dial 7.

When the vehicle or train stops, the dial 84 will be moved upwardly in the manner heretofore described, by the operation of the governor 93, which will move the dial 84 into engagement with the pencils 85 and 86 which will record, by the movement of the clock hands 4 and 5, at the time which the car or train is standing still.

From the foregoing description taken in connection with the accompanying drawings the advantages of the construction and of the method of operation of the improved combined clock, speed regulator and recorder will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, a clock mechanism, a rotatable dial controlled by said clock mechanism, an indicating hand for movement about said dial, means for moving said indicating hand in accordance with the speed of travel of the vehicle, means carried by said indicating hand and movable radially to or from the center of the dial for designating upon the dial the rate of speed of travel of the vehicle, and means operable by said indicating mechanism operating means for co-action with the clock hand for designating the time at which a vehicle stops and the length of time which the vehicle is stopped.

2. In a device as set forth, the combination of a clock mechanism embodying hands, depending styli carried by said hands, a rotatable dial, means for rotating said dial synchronously with the movement of said clock hands, an indicating hand for coacting with said dial, means for moving said indicating hand about said dial, means carried by said indicating hand for marking visual designations upon said dial, means for moving said last named means longitudinally along said indicating hand, a ring dial positioned exteriorly of said rotatable dial and movable vertically for movement into and out of engagement with said styli, and means associated with said indicating hand moving means for moving said ring dial into or out of engagement with said hand carried styli upon cessation of movement of said indicating hand.

In testimony whereof I affix my signature in presence of two witnesses.

CHARLES T. COOK.

Witnesses:
E. J. FLOYD,
W. C. FRAZIER.